May 11, 1948.   J. N. BROWNING   2,441,467
BUSHING
Filed May 28, 1947
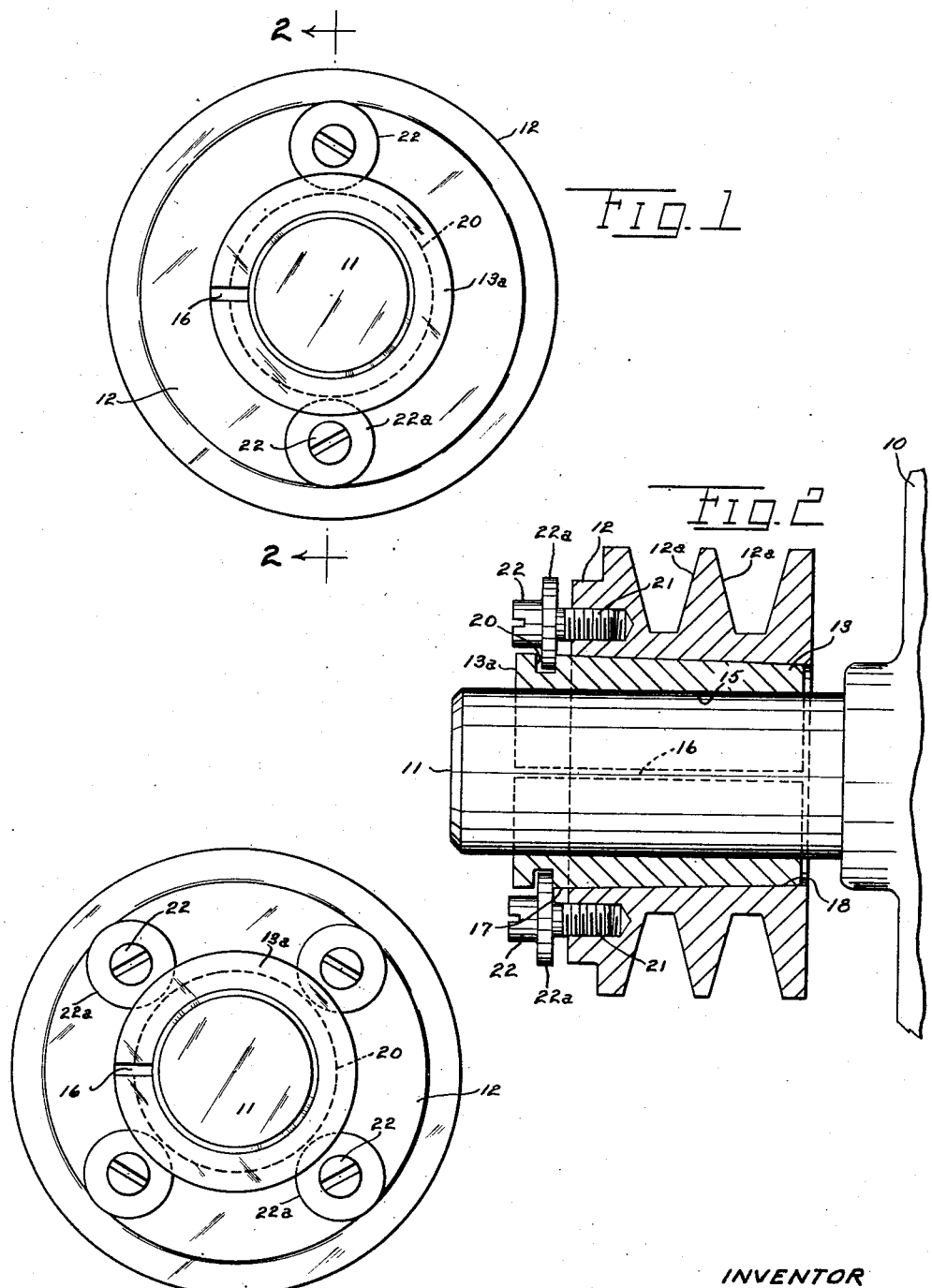
INVENTOR
JOHN N. BROWNING
By Hyde, Meyer, Baldwin & Doran
ATTORNEYS Patented May 11, 1948

2,441,467

UNITED STATES PATENT OFFICE 2,441,467

BUSHING

John N. Browning, Maysville, Ky., assignor to Browning Manufacturing Company, Inc., Maysville, Ky., a corporation of Kentucky Application May 28, 1947, Serial No. 751,057

3 Claims. (Cl. 287—52.06)

The invention relates to novel and improved bushings adapted to serve as intermediate elements between, for example, a shaft and a sheave, gear, or pulley rotatable with the shaft. In such assemblies the function of the bushing is to maintain a rigid, fixed driving relationship between the shaft and the driving or driven member thereon.

An object of the invention is to provide a bushing of novel, simple, and efficient structure which permits rapid and positive attachment and detachment of the hub of a pulley or other device on a shaft.

Another object of the invention is to provide a bushing of the type defined in the last preceding paragraph, the bushing being provided with novel means adapted either to apply the hub and bushing to the shaft or to detach the same from the shaft.

Further objects of the invention in part are obvious and in part will appear more in detail hereinafter.

In the drawings, Fig. 1 is an end elevational view of an assembly comprising a shaft, bushing, and sheave; Fig. 2 is a vertical sectional view taken on the line 2—2 of Fig. 1; Fig. 3 is a view similar to Fig. 1 but showing a slightly modified embodiment of the invention.

In the embodiment of the invention shown in Figs. 1 and 2 I have conventionally shown a fragmentary portion of a motor 10 from which a stub shaft 11 extends. A sheave 12 provided, in the present instance, with a pair of V belt grooves 12a is retained on the stub shaft by a tubular bushing 13 now to be described. It will be obvious to those skilled in the mechanical arts that a pulley, wheel hub, or other appliance may be substituted for sheave 12 as long as it is adapted to be affixed to the shaft 11.

The bushing 13 is of course telescopingly mountable on the shaft, and its inner bore 15 is made slightly oversize for easy application to the shaft. The bushing however is adapted to be resiliently contractable to grip the shaft by reason of a slot 16 extending completely through the bushing along its full length.

The outer surface 17 of the bushing and the inner surface 18 of the sheave hub are tapered to complementary angles, and it will be apparent that when the bushing is telescopingly assembled on the shaft and the sheave is telescopingly assembled on the bushing, forcible advance of the sheave on the bushing produces concentric contraction of the bushing into tight contact with the shaft.

I have provided novel means for drawing the sheave onto the bushing as aforesaid, said means being cooperative with a special surface feature of the bushing. The end portion 13a of the bushing, outwardly beyond contact with the sheave bore, is provided with a peripheral groove 20 (Fig. 2). The outer end of sheave 12 has a pair of diametrically opposed apertures 21, suitably threaded to receive the threaded shanks of a respective pair of collar screws 22, this terminology being selected to denote that each screw is provided at its neck portion with a peripheral flange 22a, a portion of which is seatable in groove 20.

The assembly and operation of the device will now be apparent. With the sheave and bushing disassembled, and removed from the shaft, the sheave is telescopingly advanced on the bushing until its end face contacts the threaded shank ends of the collar screws which have been previously placed in readiness with their flange portions in groove 20. The sheave and bushing are relatively rotated until the screw shanks come into alignment with apertures 21 in the sheave. After a few screw turns to catch the threads, but before the bushing has been radially reduced sufficiently to prevent its application to the stub shaft, the assembly is disposed on said shaft at the proper place, and the screws are again turned. In this operation the screw serves as drawing-up means, pulling the sheave onto the bushing and simultaneously tightening the bushing on the shaft.

If it be desired to remove the assembly from the shaft, rotation of the screw in the opposite direction forces the sheave from the bushing, permitting the split bushing to expand sufficiently for such removal.

It will be apparent that all effort required in assembling the sheave on the bushing, or removing it therefrom, is applied by means of the collar flange 22a on one or other transverse wall of the groove 20. In previous devices of this nature other and more complex systems have been used for assembling the respective parts, and for disassembling them. This is the first instance known to me wherein the same instrumentality, namely the collar screws and surface groove, is used for both operations.

A slightly modified embodiment of the invention is shown in Fig. 3. In this embodiment four collar screws provide doubled potentiality for the application of force to unite or separate the sheave and bushing assembly on the shaft 11. The continuous groove 20 permits any suitable screw arrangement and spacing at any point on the circumferential periphery.

What I claim is:

1. A shaft-mountable unit of the character described comprising, in combination, a bushing having an axial bore adapted to receive a shaft, said bushing being of sleeve like character and having a base, and a body provided with an external surface conically tapering away from said base, a machine element having a hub provided with an axial bore, said bore being tapered so as to be complementary to, and receivable upon, the tapered outer surface of the bushing body, an external surface portion of said base having a slot adjacent to, and in a plane parallel to, the end face of said hub, said end face having a threaded aperture, a screw seated in said aperture and rotatably advanceable and retractable therein, said screw having a transverse flange extendable into said slot, whereby rotation of said screw forces said flange against the wall of said slot in the direction of screw travel, so as to produce relative movement between the complementary tapered surfaces of the hub and the bushing.

2. A shaft-mountable unit of the character described comprising, in combination, a bushing having an axial bore adapted to receive a shaft, said bushing being of sleeve like character and having a base, and a body provided with an external surface conically tapering away from said base, a machine element having a hub provided with an axial bore, said bore being tapered so as to be complementary to, and receivable upon, the tapered outer surface of the bushing body, an external surface portion of said base having a slot adjacent to, and in a plane parallel to, the end face of said hub, said slot extending peripherally completely around said base, said end face of said hub being provided with a plurality of threaded apertures spaced circumferentially therearound, and disposed slightly radially outwardly from the hub bore so as to be adjacent the base of said bushing, a plurality of screws disposed one in each aperture and rotatably advanceable and retractable therein, each such screw having a transverse flange extendable into said slot, whereby rotation of said screws forces their respective flanges against the wall of said slot in the direction of screw travel, so as to produce relative movement between the complementary tapered surfaces of the bushing and the hub.

3. A shaft-mountable unit of the character described comprising, in combination, a bushing having an axial bore adapted to receive a shaft, said bushing being of sleeve like character and having a base, and a body provided with an external surface conically tapering away from said base, a machine element having a hub provided with an axial bore, said bore being tapered so as to be complementary to, and receivable upon, the tapered outer surface of the bushing body, an external surface portion of said base having a slot adjacent to, and in a plane parallel to, the end face of said hub, said end face having a threaded aperture, a screw seated in said aperture and rotatably advanceable and retractable therein, said screw having a transverse flange extendable into said slot, whereby rotation of said screw forces said flange against the wall of said slot in the direction of screw travel, so as to produce relative movement between the complementary tapered surfaces of the hub and the bushing, said bushing having a longitudinal slot extending completely through the wall along one side thereof whereby the bushing is radially expandable and contractable, and whereby enforced relative endwise movement of said hub on said bushing causes contraction or permits expansion of the bushing dependent upon the direction of such movement.

JOHN N. BROWNING.